United States Patent
Greenwood et al.

(10) Patent No.: US 9,441,921 B2
(45) Date of Patent: Sep. 13, 2016

(54) GUNNER ACCESSORY PACKAGE

(75) Inventors: Kyle L. Greenwood, Bryan, TX (US); Joshua Price, Bryan, TX (US); James Buckner, Bryan, TX (US)

(73) Assignee: Black Mountain Industries, Inc., Bryan, TX (US)

( * ) Notice: Subject to any disclaimer, the term of this patent is extended or adjusted under 35 U.S.C. 154(b) by 0 days.

(21) Appl. No.: 13/364,234

(22) Filed: Feb. 1, 2012

(65) Prior Publication Data

US 2013/0081533 A1 Apr. 4, 2013

Related U.S. Application Data

(63) Continuation-in-part of application No. 13/250,852, filed on Sep. 30, 2011, now Pat. No. 9,163,908.

(51) Int. Cl.
*F41H 5/20* (2006.01)
*B60R 21/04* (2006.01)
*F41H 7/04* (2006.01)

(52) U.S. Cl.
CPC .............. *F41H 7/046* (2013.01); *B60R 21/04* (2013.01); *F41H 5/20* (2013.01)

(58) Field of Classification Search
CPC ........................................................ F41H 5/20
USPC ....... 89/36.07, 36.08, 36.05, 36.13; 428/911; 296/187.05, 187.07, 190.03; 280/748, 280/749, 751
See application file for complete search history.

(56) References Cited

U.S. PATENT DOCUMENTS

| | | | |
|---|---|---|---|
| 1,324,234 A | 12/1919 | Daigre | |
| 1,589,517 A | 6/1926 | Desmarquoy | |
| 2,332,357 A | 10/1943 | Uffelman | |
| 2,436,461 A * | 2/1948 | Tritt et al. | 280/751 |
| 2,606,755 A | 8/1952 | Samuels | |
| 2,626,163 A | 1/1953 | Scantlebury | |
| 2,820,648 A * | 1/1958 | Wanzenberg | 280/752 |
| 3,224,924 A * | 12/1965 | Von Ardenne et al. | 428/117 |
| 3,491,847 A | 1/1970 | Abbott | |
| 3,648,613 A * | 3/1972 | Cunn | F42D 5/05 102/303 |
| 3,801,416 A | 4/1974 | Gulbierz | |
| 3,843,155 A * | 10/1974 | Foster | 280/751 |
| 4,287,621 A | 9/1981 | Kertz | |
| 4,316,404 A | 2/1982 | Medlin | |
| 4,693,166 A | 9/1987 | Pehker et al. | |

(Continued)

FOREIGN PATENT DOCUMENTS

| | | |
|---|---|---|
| GB | 173079 A | 12/1921 |
| WO | 2008/109069 A1 | 9/2008 |
| WO | 2008/109140 A1 | 9/2008 |

OTHER PUBLICATIONS

USPTO Office Action for U.S. Appl. No. 13/250,852 dated Jul. 3, 2012.

(Continued)

*Primary Examiner* — Reginald Tillman, Jr.
(74) *Attorney, Agent, or Firm* — Tumey L.L.P.

(57) ABSTRACT

A protected firing platform protection system protects personnel from contact with the protected firing platform. In an embodiment, the protected firing platform protection system is adapted for use with a protected firing platform of a military vehicle. The protected firing platform protection system includes a protective padding attached to the protected firing platform. The protective padding includes an energy mitigation padding.

20 Claims, 12 Drawing Sheets

(56) References Cited

U.S. PATENT DOCUMENTS

| | | | |
|---|---|---|---|
| 4,828,287 | A | 5/1989 | Siler |
| 4,915,998 | A | 4/1990 | Parenti et al. |
| 5,065,688 | A | 11/1991 | Moody |
| 5,448,938 | A * | 9/1995 | Fernandez et al. .......... 89/36.02 |
| 5,460,409 | A * | 10/1995 | Conner ........................ 280/749 |
| 5,722,729 | A | 3/1998 | Carilli |
| 5,939,658 | A | 8/1999 | Muller |
| 6,161,462 | A | 12/2000 | Michaelson |
| 6,175,958 | B1 | 1/2001 | Wu |
| 6,405,909 | B1 | 6/2002 | Burnett et al. |
| 6,669,233 | B2 | 12/2003 | Gabriel |
| 6,696,128 | B2 | 2/2004 | McIntee et al. |
| 6,807,890 | B1 | 10/2004 | Fuqua |
| 6,893,703 | B2 | 5/2005 | McIntee et al. |
| 6,899,009 | B2 | 5/2005 | Christiansen et al. |
| 7,102,814 | B1 | 9/2006 | Hughes |
| 7,389,718 | B1 | 6/2008 | Carter et al. |
| 7,488,017 | B2 | 2/2009 | Lassl et al. |
| 2005/0243331 | A1 | 11/2005 | Ishima et al. |
| 2010/0107861 | A1 | 5/2010 | Carter |
| 2011/0290105 | A1 | 12/2011 | Greenwood |

OTHER PUBLICATIONS

Max—Grimloc Maxpedition Hard—use Gear Grimloc Carabiners, One Stop Knife Shop, May 9, 2007, Retrieved from the Internet at http://onestopknifeshop.com/store/maxpedition-grimlock-carabiner.html.

Ammo Can Cover, Tactical Tailor, Dec. 4, 2010, Retrieved from the Internet at http://www.emgear.net/Products/ProductPage.aspx?id=1369.

International Search Report and Written Opinion for International Application No. PCT/US2012/057962 dated Apr. 18, 2014.

International Preliminary Report and Written Opinion for International Application No. PCT/US2012/057962 dated May 22, 2014.

USPTO Office Action for U.S. Appl. No. 13/250,852 dated Jun. 30, 2014.

USPTO Final Office Action for U.S. Appl. No. 13/250,852 dated Dec. 18, 2013.

USPTO Final Office Action for U.S. Appl. No. 13/250,852 dated Jan. 22, 2015.

Office Action for U.S. Appl. No. 13/250,852 dated Feb. 21, 2013.

USPTO Office Action for U.S. Appl. No. 14/850,456 dated Oct. 16, 2015.

Supplementary European Search Report for Application No. EP 12 85 9560 dated Apr. 10, 2015.

USPTO Office Action for U.S. Appl. No. 13/250,852 dated Jun. 26, 2013.

* cited by examiner

GUNNER ACCESSORY PACKAGE

CROSS-REFERENCE TO RELATED APPLICATIONS

This application is a continuation-in-part of U.S. application Ser. No. 13/250,852 filed on Sep. 30, 2011, which is herein incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of military applications and more specifically to the field of blunt force trauma protection systems for military personnel.

2. Background of the Invention

There is an increasing need for added protection for gunners and other personnel in gun turrets of military vehicles. Improvised explosive devices and other methods for attacking military vehicles have drawn added interest in the safety of gunners. Conventional methods for protecting gunners include reliance on the outer armor of the gun turret. Drawbacks to such conventional methods include instances in which force from the explosive devices enters the interior of the military vehicle or impacts against the side of the vehicle, or instances in which maneuvering of the vehicle to avoid a blast or other related obstacles may place the gunner at severe risk of injury or death. For instance, the blunt force trauma from contact of the gunner against the sides of the gun turret may place the gunner at such risk.

Methods have been developed to overcome such drawbacks. For instance, reactive armor on the outside of the military vehicle and body armor worn by the gunner have been developed. Drawbacks to such developments also include risk of injury or death when the explosive forces enter the interior of the gun turret.

Consequently, there is a need for improved methods for protecting gunners in gun turrets of military vehicles from explosive forces.

BRIEF SUMMARY OF SOME OF THE PREFERRED EMBODIMENTS

These and other needs in the art are addressed in one embodiment by a protected firing platform protection system. The protected firing platform protection system is adapted for use with a protected firing platform of a military vehicle. The protected firing platform protection system includes a protective padding attached to the protected firing platform. The protective padding includes an energy mitigation padding.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
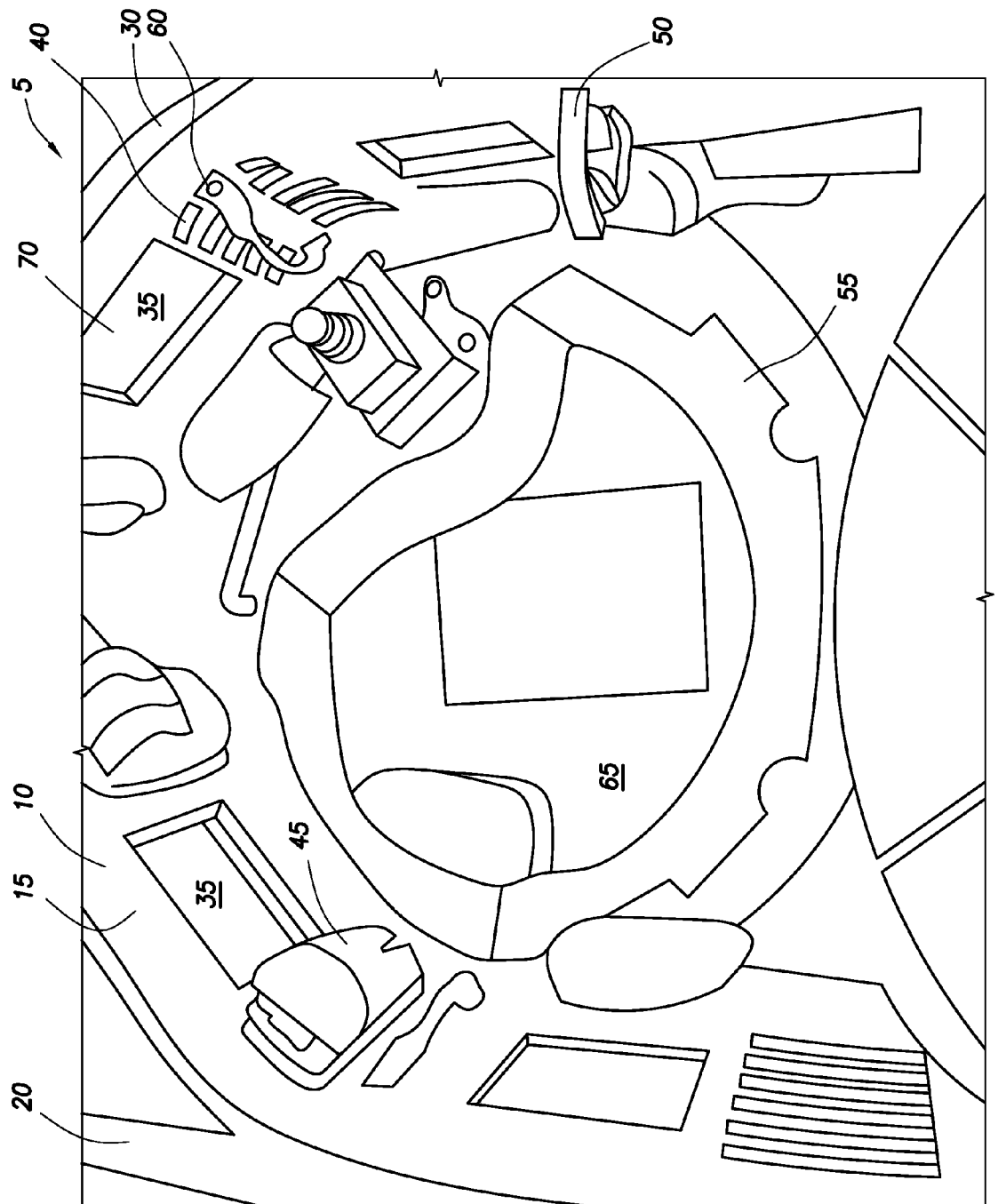
FIG. 1 illustrates a top view of an embodiment of a personnel protection system.
Figure 2:
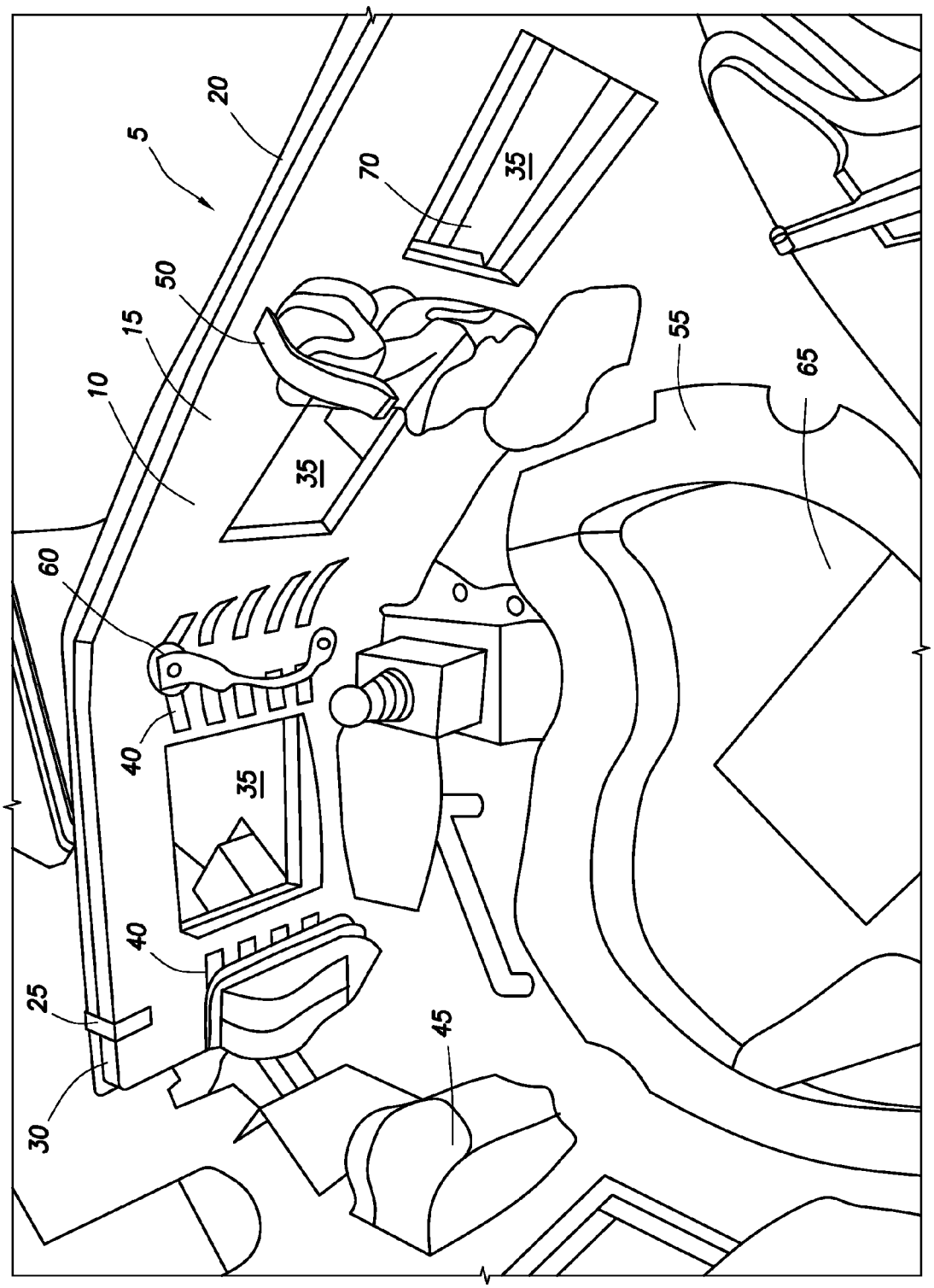
FIG. 2 illustrates a top perspective view of the personnel protection system shown in FIG. 1.
Figure 3:
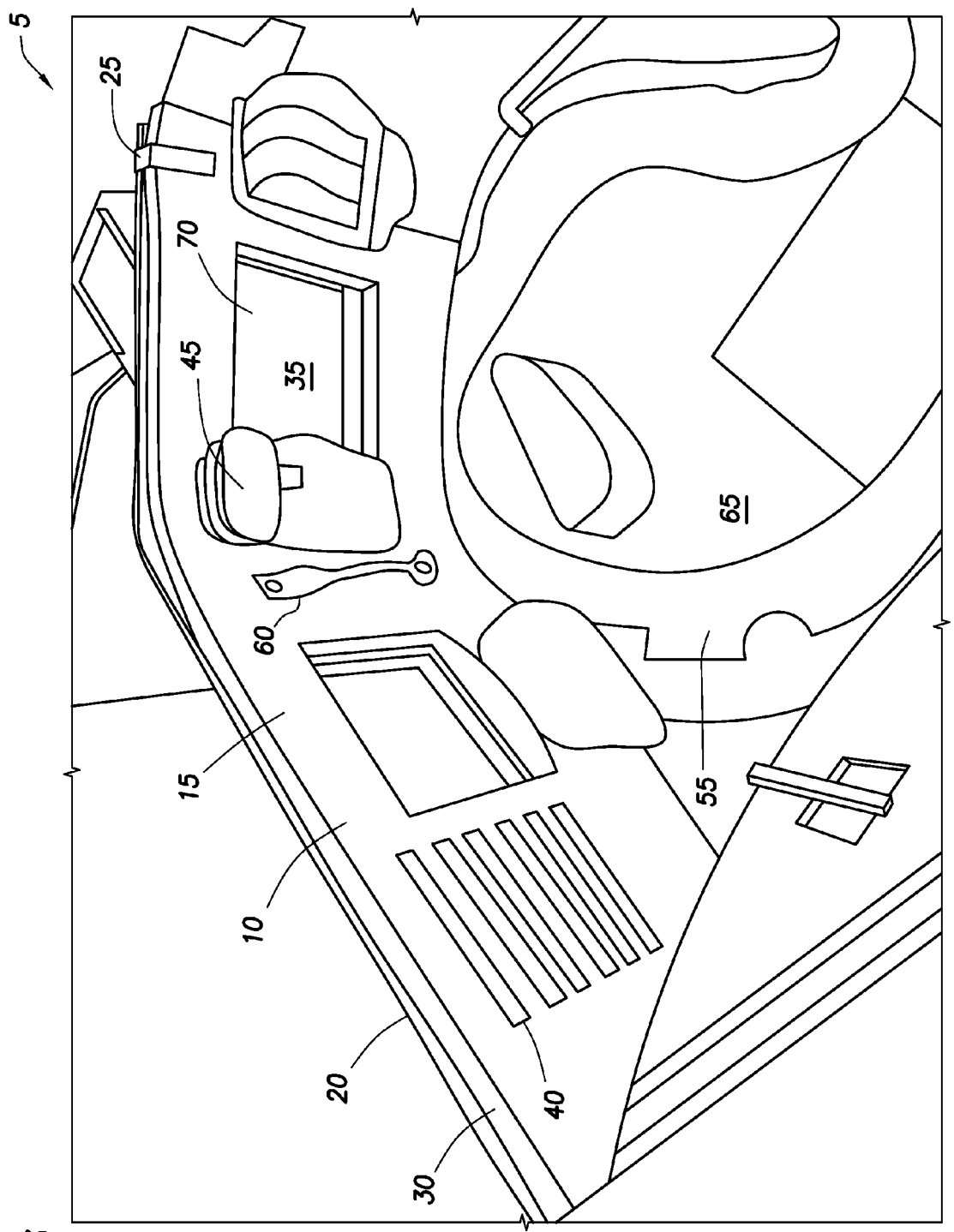
FIG. 3 illustrates a top perspective view of a portion of the personnel protection system shown in FIG. 1.

FIGS. 1, 2, and 3 illustrate an embodiment of a personnel protection system 5 installed in a protected firing platform 20. Embodiments of personnel protection system 5 provide flame resistant and anti-ballistic padded protection for personnel in protected firing platform 20. Other embodiments of personnel protection system 5 provide protection for personnel (i.e., a gunner) in protected firing platform 20 from potentially damaging blunt force trauma from contact against the sides of protected firing platform 20. For instance, without limitation, personnel protection system 5 provides protection to the ribs, head, and the like of personnel by providing a cushioned contact between the personnel and the sides of protected firing platform 20. Without limitation, personnel protection system 5 provides protection against blunt force trauma (i.e., to the body and head) of personnel (i.e., gunner) in protected firing platform 20. Further, without limitation, personnel protection system 5 improves survivability as well as increases comfort to personnel. Protected firing platform 20 may include any device that protects personnel in the performance of their duties. Such duties may include any duties carried out by personnel on a military vehicle such as, without limitation, firing a weapon. Without limitation, examples of protected firing platform 20 include turrets (i.e., gun turrets), cupolas, finials, or any other protective protrusions. In an embodiment, protected firing platform 20 is a turret. The military vehicle may be any type of military vehicle. Without limitation, military vehicles include land-borne military vehicles (i.e., armored personnel carriers, tanks, and the like), water-borne military vehicles (i.e., boats, ships, and the like), air-borne military vehicles (i.e., helicopters or planes). In some embodiments, the military vehicle is a tactical wheeled vehicle.

As shown in FIGS. 1, 2, and 3, personnel protection system 5 has blanket 10. Blanket 10 may have any desirable configuration. In an embodiment as illustrated in FIGS. 1, 2, and 3, blanket 10 has a configuration suitable for placement on protected firing platform 20. Without limitation, by having a configuration suitable for protected firing platform 20, personnel protection system 5 may not provide any new hazards to personnel. Further, without limitation, blanket 10 may have a thickness suitable for use in protected firing platform 20 that may not reduce operational area in protected firing platform 20 due to limited available area. In embodiments as shown in FIGS. 1, 2, and 3, protected firing platform 20 is a turret, and blanket 10 is disposed about the interior sides of the turret. It is to be understood that the embodiments of FIGS. 1, 2, and 3 illustrate an embodiment in which protected firing platform 20 is a turret on a land-borne military vehicle. In some embodiments (not illustrated), configurations of blanket 10 are designed for the interiors of different protected firing platforms 20. In embodiments, personnel protection system 5 has a blanket 10 with a configuration suitable for a selected configuration of an interior of a protected firing platform 20.

Figure 4:
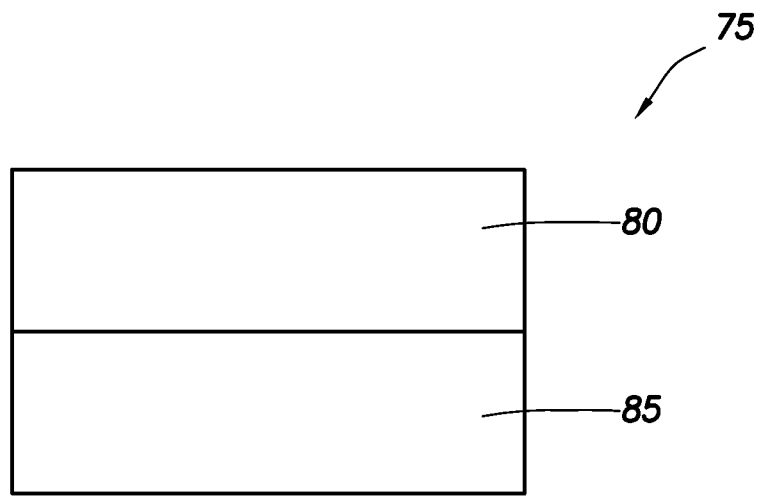
FIG. 4 illustrates an embodiment of a protective insert having a low velocity impact protection layer and a high velocity impact protection layer.

Blanket 10 includes carrier 15. Blanket 10 also has an interior (not illustrated) in which a protective padding 75 (illustrated in FIGS. 4, 5) may be disposed. Carrier 15 is an outer bag in which the interior of blanket 10 is disposed. Carrier 15 may be composed of any materials suitable for use in a military vehicle. In an embodiment, carrier 15 is composed of flame retardant and/or fluid resistant materials. Without limitation, the flame retardant materials provide further protection against explosive forces. In addition, without limitation, the fluid resistant materials protect the interior of carrier 15 and contents therein from fluids (i.e., the fluid resistant materials protect the protective padding 75 from potential damage from harmful fluids such as grease or oil). In some embodiments, carrier 15 is coated with flame retardant and/or fluid resistant materials. In some embodiments, carrier 15 is comprised of materials that reduce ultraviolet light damage and/or may have a coating of an ultraviolet light protection material. Without limitation, blanket 10 therefore may be suitable for any environmental conditions and temperatures. In embodiments, the interior of carrier 15 is accessible along carrier top portion 30. In an embodiment, the interior is accessible along any suitable portion of carrier top portion 30 to allow access to the interior and to allow desired inserts such as protective padding 75 (as shown in FIG. 4) to be inserted therein and/or removed therefrom. In embodiments, carrier 15 also has carrier closure means (not illustrated). In some embodiments, the carrier closure means are operable to open and close access to the interior of carrier 15. The carrier closure means include any suitable means for closing an opening into the interior of carrier 15. Examples of suitable carrier closure means include buttons, clamps, zippers, and the like. In an embodiment, the carrier closure means are a zipper. Without limitation, a zipper facilitates an efficient method for opening and closing access to the interior of carrier 15.

Figure 6:
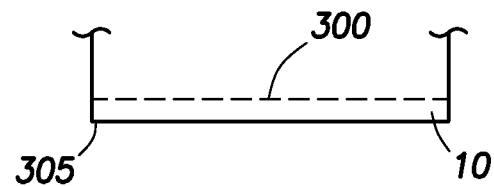
FIG. 6 illustrates a top view of an embodiment of a carrier and stitching.
Figure 7:
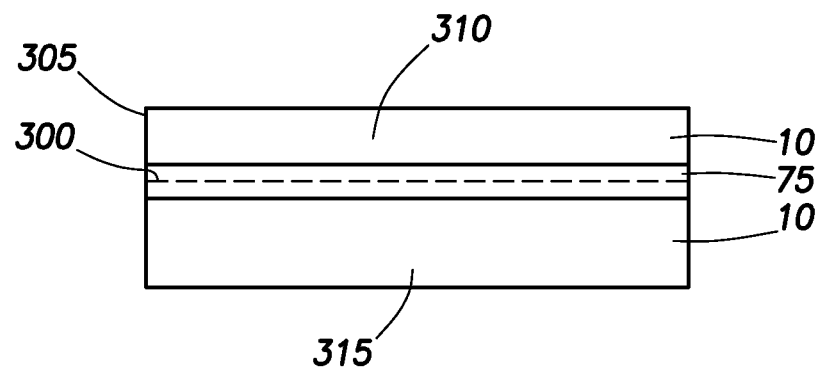
FIG. 7 illustrates a cross sectional side view of an embodiment of a carrier with protective padding and stitching.

In some embodiments, carrier 15 is not openable and closeable (i.e., not openable and closeable along carrier top portion 30). In such embodiments, protective padding 75 is disposed in the interior of carrier 15. In an embodiment, protective padding is secured to carrier 15. Protective padding 75 may be secured to carrier 15 by any suitable means. Examples of such suitable means include stitching, adhesive, VELCRO®, and the like. FIG. 6 illustrates a top view of a portion of blanket 10 having stitching 300. FIG. 7 illustrates a cross sectional side view of the embodiment of FIG. 6. In an embodiment as shown, stitching 300 is proximate to edge 305 of blanket 10. In some embodiments as shown, stitching 300 secures protective padding 75 (i.e., the outer edge of protective padding 75) to edge portions 310, 315 of blanket 10. In some embodiments, blanket 10 has stitching 300 substantially around the perimeter of blanket 10. Without limitation, stitching 300 protects protective padding 75 against fluids by not allowing such fluids into the interior of blanket 10.

Protective padding 75 may include any type of padding suitable for protecting the personnel against blunt force trauma from contact with a part of the vehicle (i.e., a part of the protected firing platform 20). In embodiments, protective padding 75 is an energy mitigation padding. The energy mitigation padding may be any type of padding suitable for attenuating and/or absorbing energy (i.e., energy from contact force). It is to be understood that attenuating energy refers to reducing the strength of energy. It is also to be understood that absorbing energy refers to the padding absorbing energy. In an embodiment, the energy mitigation padding is energy attenuating padding. The energy attenuating padding may be any padding suitable for attenuating energy. In an embodiment, the energy attenuating padding is energy attenuation foam, honeycomb structures, visco-elastic material, or any combinations thereof. The energy attenuation foam may include any foam that attenuates energy. In an embodiment, the energy attenuation foam includes polymeric foam. Any suitable polymeric foam that attenuates energy may be used. Without limitation, examples of suitable polymeric foams include polyethylene foam, polyurethane foam, or any combinations thereof. In some embodiments, the energy attenuation foam includes metallic foam. Any metallic foam suitable for energy attenuation may be used. In an embodiment, the metallic foam includes nickel coated metallic foam. The visco-elastic material includes any suitable visco-elastic materials. Without limitation, examples of suitable visco-elastic materials include amorphous polymers, semi-crystalline polymers, bio-polymers, bitumen materials, or any combinations thereof. In embodiments, the energy mitigation padding is energy absorption padding. In an embodiment, the energy absorption padding is polymeric foam.

In embodiments, the energy mitigation padding has layers of different impact protection. In some embodiments, energy mitigation padding has a high velocity impact protection layer (i.e., configured for forces from a vehicle roll-over or blast event) and a low velocity impact protection layer (i.e., configured for forces from vibrations of the vehicle or from typical movement of the vehicle). The high velocity impact protection layer may provide protection against any high velocity contact of the personnel against protected firing platform 20, and the low velocity impact protection layer may provide protection against any low velocity contact of the personnel against protected firing platform 20. The high velocity impact protection layer may include contact of the personnel against protected firing platform 20 between about 100 ft/s and about 6,000 ft/s, and alternatively between about 50 ft/s and about 6,000 ft/s. The low velocity impact protection layer may include contact of the personnel against protected firing platform 20 between about 1 ft/s and about 50 ft/s, alternatively between about less than 1 ft/s to about more than 0 ft/s. In embodiments, the material for each of the layers may be different to provide the low velocity impact protection layer and the high velocity impact protection layer. In other embodiments in which protective padding 75 is foam padding, the densities of the foam padding of the high velocity impact protection layer and the low velocity impact protection layer may be different to provide the desired impact resistances. For instance, embodiments may include the low velocity impact protection layer having a lower density than the high velocity impact protection layer. Without limitation, the energy mitigation padding may reduce accelerative injuries due to vehicle turnovers and the like. Further, without limitation, the energy mitigation padding may not have a significant reduction in impact resistance due to repeated routine contact with personnel and/or devices (i.e., weapons, etc.).

FIG. 4 illustrates an embodiment of protective padding 75 in which protective padding 75 has low velocity impact protection layer 80 and high velocity impact protection layer 85. In alternative embodiments (not illustrated), protective padding 75 has more than one low velocity impact protection layer 80 and/or more than one high velocity impact protection layer 85. In other alternative embodiments, protective padding 75 has a low velocity impact protection layer 80 or a high velocity impact protection layer 85. Low velocity impact protection layer 80 and high velocity impact protection layer 85 may have any desired thickness and configuration. Low velocity impact protection layer 80 and high velocity impact protection layer 85 may be disposed in any suitable order. In embodiments, low velocity impact protection layer 80 is disposed in a distal position to protected firing platform 20 with high velocity impact protection layer 85 disposed in the proximate position to protected firing platform 20 between low velocity impact protection layer 80 and protected firing platform 20.

Figure 5:
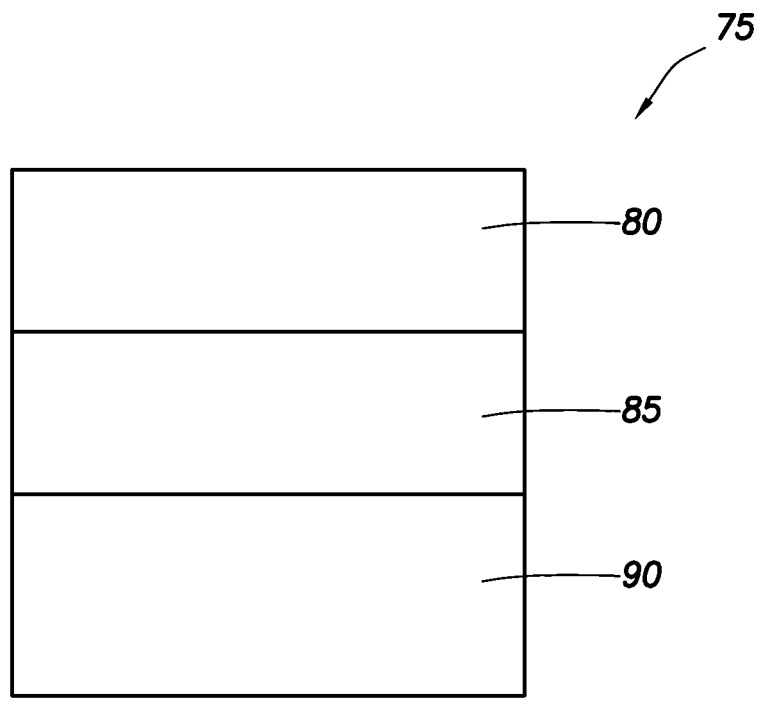
FIG. 5 illustrates an embodiment of a protective padding having a low velocity impact protection layer, a high velocity impact protection layer, and a ballistic layer.

FIG. 5 illustrates a cross sectional view of an embodiment of protective padding 75 in which protective padding 75 includes low velocity impact protection layer 80, high velocity impact protection layer 85 and ballistic layer 90. In other embodiments (not illustrated), protective padding 75 has more than one ballistic layer 90. Ballistic layer 90 may be disposed in any suitable order in relation to low velocity impact protection layer 80 and high velocity impact protection layer 85. In an embodiment, ballistic layer 90 is disposed proximate protected firing platform 20. Ballistic layer 90 includes any materials suitable for stopping or reducing the velocity of projectiles. In an embodiment, ballistic layer 90 includes aramid fibers. A commercial example of suitable materials includes KEVLAR® (a registered trademark of E.I. du Pont de Nemours and Company). In an embodiment, a portion or all of protective padding 75 is coated and/or covered in a fluid resistant material and/or a flame resistant material. Protective padding 75 may have any suitable configuration. In an embodiment, protective padding 75 has a configuration that is similar to that of the blanket 10 in which it is disposed. Without limitation, such an embodiment improves the protection capability of the blanket 10 as the similar configuration of the protective padding 75 maximizes protection within the configuration of the blanket 10.

In some embodiments, blanket 10 has an expandable surface. Without limitation, an expanded surface provides protection in addition to that of protective padding 75 to personnel against blunt trauma from contact with protected firing platform 20. The expandable surface may cover a portion or substantially all of the surface of blanket 10. In an embodiment, the surface covered by the expandable surface is on the opposing side of blanket 10 from the wall of protected firing platform 20 to which blanket 10 is attached. The expandable surface may be composed of any expandable material such as rubber, nylon, polychloroprene, latex, or any combinations thereof. In such embodiments, blanket 10 has one or more inflators that provide inflation to expand the expandable surface. The inflator may include any means suitable for inflating the expandable surface. In some embodiments, the inflator is disposed within protective padding 75. In such embodiments, upon a sufficient contact force against blanket 10, the inflator is actuated and inflates the expandable surface. In some embodiments, the inflator has a nozzle disposed outside of the hatch pad and that takes outside gas (i.e., air or another sufficient gas/vapor) and through a channel provides the gas to the expandable surface to expand the expandable surface.

Personnel protection system 5 may include any suitable means for attaching blanket 10 to the interior sides of protected firing platform 20. In embodiments as illustrated, personnel protection system 5 includes attachment devices 25. In embodiments, attachment devices 25 prevent carrier top portion 30 from hanging down when installed. Attachment devices 25 may be any suitable devices for attaching carrier top portion 30 to protected firing platform 20. Without limitation, examples of suitable attachment devices 25 include hooks, straps, clamps, and the like. In an embodiment, attachment devices 25 are clamps. In embodiments as illustrated, attachment devices 25 are disposed at sufficient intervals along carrier top portion 30 to prevent carrier top portion 30 from hanging down. In embodiments, securing means are used in addition to attachment devices 25 to secure blanket 10 to the interior of protected firing platform 20. Any suitable securing means may be used. In embodiments, the securing means includes securing blanket 10 to the interior of protected firing platform 20 by adhesive. Without limitation, a commercial example of a suitable adhesive is CB200, which is commercially available from Click Bond, Inc. In an embodiment, blanket 10 is attached to protected firing platform 20 without altering the existing structural integrity of protected firing platform 20.

In an embodiment as illustrated, blanket 10 includes pockets 45. Blanket 10 may include any suitable number and type of pockets 45. In embodiments, pockets 45 are disposed at suitable locations on the sides of blanket 10. In some embodiments, pockets 45 are removeably attached to the sides of blanket 10.

In embodiments as shown, blanket 10 also includes molle strips 40. It is to be understood that molle strips 40 refer to a grid of webbing that is used to attach smaller equipment onto load bearing devices (i.e., the sides of blanket 10). In some embodiments, a pocket 45 may be attached to molle strips 40. In embodiments (not illustrated), personnel protection system 5 also includes a clip attached to a molle strip 40 or more than one clip with each clip attached to a different molle strip 40. The clip may be any type of clip suitable for allowing a device (i.e., wire, etc.) to hang from a molle strip 40. In embodiments, the clip is a locking molle carbiner such as a locking D-ring.

In an embodiment as illustrated, personnel protection system 5 also includes handles 60. Handles 60 are secured to blanket 10. In an embodiment, handles 60 are also secured to protected firing platform 20. Handles 60 may be secured by any suitable means. In embodiments, handles 60 are bolted or screwed to protected firing platform 20. In such embodiments, the bolts or screws pass through blanket 10 and into protected firing platform 20. Handles 60 may be composed of any suitable material. In an embodiment, handles 60 are composed of webbing. In some embodiments, handles 60 are coated with a suitable coating. In an embodiment, the coating is rubber. Without limitation, a handle 60 composed of webbing and coated with rubber may improve comfort and durability.

In some embodiments as shown, personnel protection system 5 includes fasteners 50. Fasteners 50 are secured to blanket 10 and are suitable for attaching objects to blanket 10. Fasteners 50 may include any suitable fastening devices for attaching objects to blanket 10. Without limitation, examples of suitable fastening devices include VELCRO® (a registered trademark of Velcro Industries B.V.) and the like. In such embodiments, one end of fastener 50 is secured to blanket 10, and the opposing end of fastener 50 has the VELCRO® for attachment purposes.

As shown, embodiments of personnel protection system 5 have hatch pad 55. Hatch pad 55 is disposed about entry 65. It is to be understood that in the embodiments of FIGS. 1, 2, and 3 protected firing platform 20 is a turret with hatch pad 55 being a turret hatch pad and entry 65 providing the entry to the turret. In embodiments, entry 65 is the entry from the body of the vehicle into protected firing platform 20. Hatch pad 55 is composed of any material suitable for cushioning contact of personnel (i.e., a gunner) with the sides of entry 65 when entering or leaving protected firing platform 20 or being disposed in entry 65. Without limitation, hatch pad 55 protects the ribs, head, and the like of the personnel from blunt force trauma from such contact. Hatch pad 55 may be attached to entry 65 by any suitable means. In an embodiment, hatch pad 55 has an interior (not illustrated) that is configured to allow hatch pad 55 to be slid onto entry 65. In embodiments as shown, personnel protection system 5 has three hatch pads 55. It is to be understood that personnel protection system 5 is not limited to three hatch pads 55, but may have less than three or more than three hatch pads 55. In embodiments (not illustrated), personnel protection system 5 includes the hatch protection system as disclosed in patent application U.S. Ser. No. 13/364,260, filed Feb. 1, 2012 and entitled "Hatch Protection System", which is incorporated by reference herein in its entirety.

In further embodiments as shown, personnel protection system 5 has visual openings 35. Visual openings 35 are portions of personnel protection system 5 in which there are openings through blanket 10. In embodiments as shown, visual openings 35 are configured to correspond to the configuration of windows 70 of protected firing platform 20. In embodiments, a visual opening 35 is disposed proximate to a window 70. In an embodiment, the visual opening 35 allows the personnel (i.e., turret gunner) to see through the window 70.

In some embodiments of personnel protection system 5, carrier 15 includes reinforcement means (not illustrated). The reinforcement means are sewn into carrier 15. The reinforcement means may be any material suitable for improving protection of personnel in protected firing platform 20 against a blast. For instance, the reinforcement means provide added strength and further protection against blast fragments contacting carrier 15. In an embodiment, the reinforcement means include a fabric. In some embodiments, the reinforcement means include nylon fabric. In an embodiment, the reinforcement means are in the form of a web.

In alternative embodiments (not illustrated), personnel protection system 5 has protective padding 75 attached to the interior sides of protected firing platform 20 without protective padding 75 being disposed in blanket 10. In such alternative embodiments, protective padding 75 may be attached to the interior walls by any suitable means. Without limitation, suitable means for attaching protective padding 75 to the interior walls includes adhesive, bolts, screws, and the like. In some alternative embodiments, protective padding 75 is attached to the interior wall by adhesive. In some embodiments, protective padding 75 has a protective coating. The protective coating may provide protection to protective padding 75 for flame retardancy, fluid resistance, protection against ultraviolet light and the like. In embodiments, protective padding 75 has a configuration selected for a desired configuration of the interior wall of protected firing platform 20.

Figure 8:
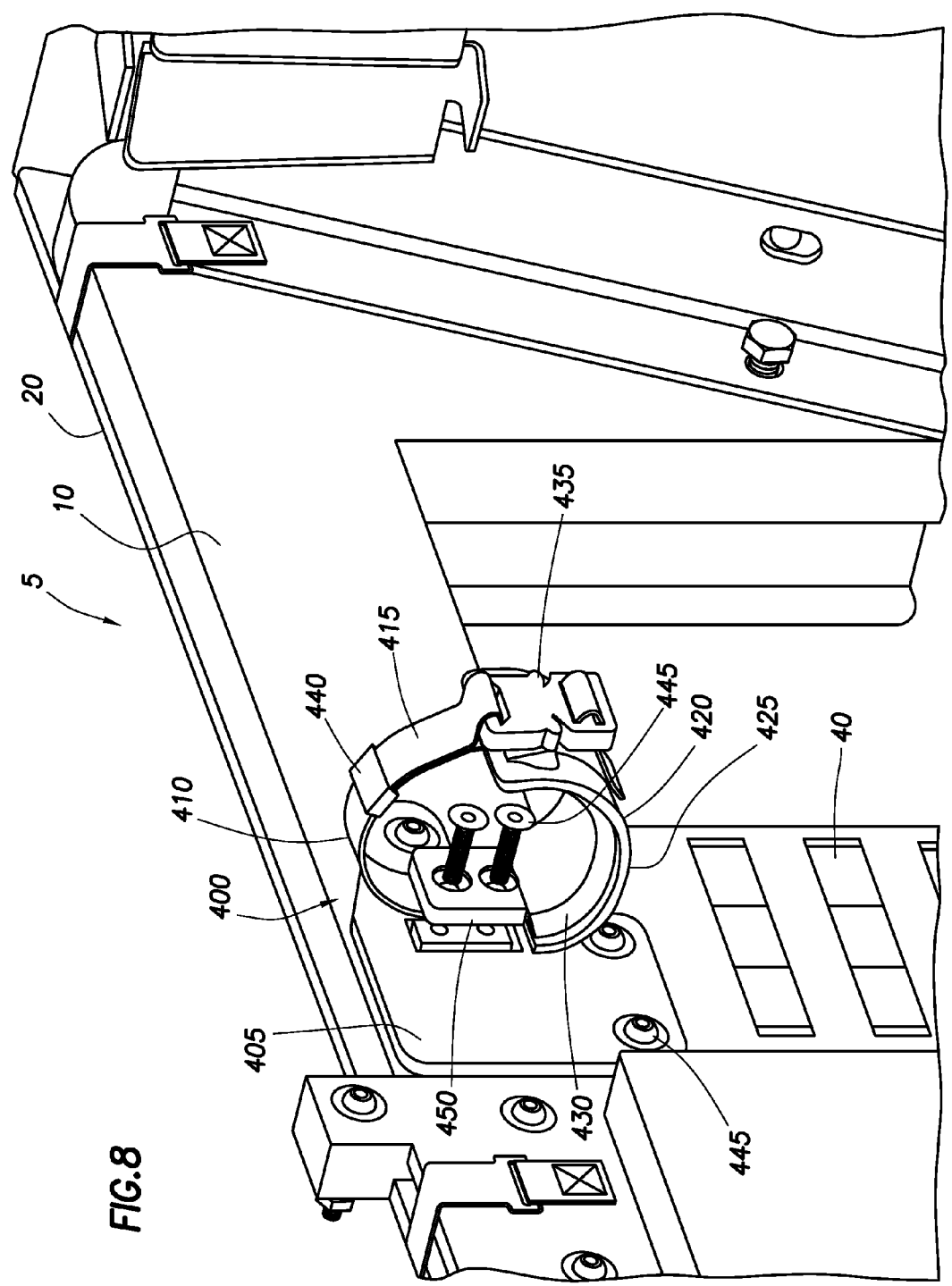
FIG. 8 illustrates an embodiment of a personnel protection system having a weapons stowage system with a weapons stowage device in a partially exploded view.
Figure 9:
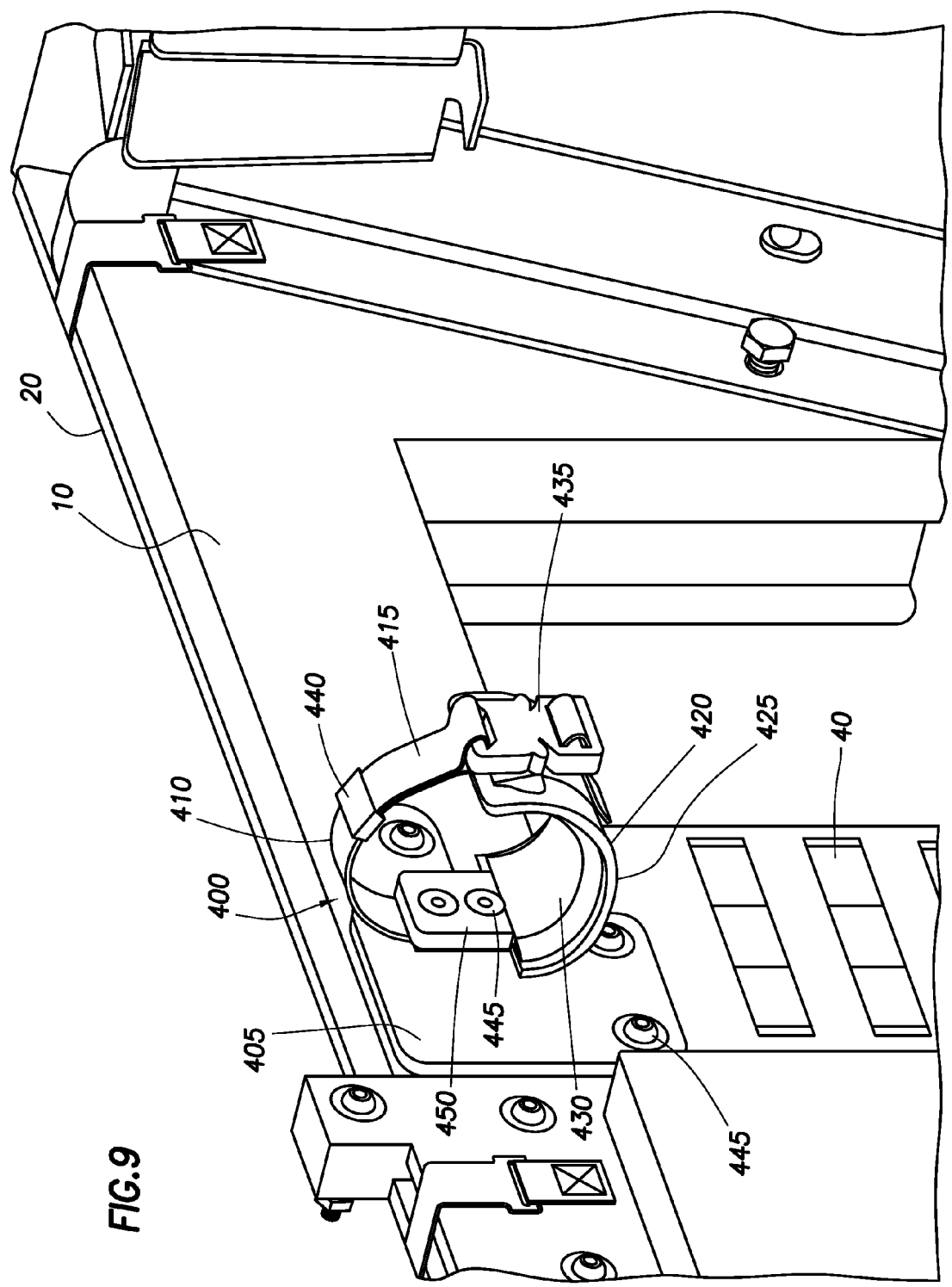
FIG. 9 illustrates an embodiment of the personnel protection system of FIG. 8 with the weapons stowage device secured to the protected firing platform.

FIGS. 8 and 9 illustrate an embodiment of personnel protection system 5 having weapons stowage system 400. Weapons stowage system 400 includes weapons stowage device 410. FIGS. 8 and 9 show weapons stowage system 400 having one weapons stowage device 410 for illustrative purposes but embodiments of weapons stowage system 400 include more than one weapons stowage device 410. In embodiments, weapons stowage system 400 has two weapons stowage devices 410 for each weapon. In some embodiments, both weapons stowage devices 410 for a particular weapon are disposed in substantially about the same horizontal plane. Without limitation, weapons stowage system 400 secures a weapon to protected firing platform 20. Further, without limitation, weapons stowage system 400 provides further protection to personnel disposed in protected firing platform 20. For instance, in the event of a vehicle rollover, the weapons secured by weapons stowage system 400 may not injure personnel in protected firing platform 20 because the weapons are not moving loosely in protected firing platform 20 but are instead secured.

As shown in FIGS. 8 and 9, weapons stowage device 410 includes weapons stowage base 405, weapons stowage strap 415, and stowage device base 420. Weapons stowage base 405 is secured to protected firing platform 20. In embodiments as shown, weapons stowage base 405 is secured to a wall of protected firing platform 20. In an embodiment, weapons stowage base 405 is secured to protected firing platform 20 by weapon stowage securing means 445. Weapons stowage securing means 445 may be any suitable securing means such as bolts, screws, and the like. In embodiments as shown, weapons stowage securing means 445 are secured into existing holes in protected firing platform 20, which, without limitation, enable securing of weapons stowage system 400 without altering the structural integrity of protected firing platform 20 (i.e., without drilling new holes into the wall).

As further shown in FIGS. 8 and 9, weapons stowage securing means 445 secure stowage device base 420 to weapons stowage base 405. In some embodiments, weapons stowage securing means 445 secure an end of weapons stowage strap 415 to weapons stowage base 405. In an embodiment, such end of weapons stowage strap 415 is secured to stowage device base 420 instead of weapons stowage base 405. In such an embodiment, weapons stowage strap 415 is secured to stowage device base 420 by any suitable means such as by adhesive, screws and the like. Stowage device base 420 includes stowage device covering 425 and stowage device support 430. In embodiments as shown, weapons stowage securing means 445 secure stowage device base 420 through an end 450 of stowage device support 430. In embodiments, stowage device support 430 is disposed within stowage device covering 425 with end 450 disposed outside of stowage device covering 425. FIGS. 8 and 9 show a cut-away illustration of stowage device covering 425 for illustrative purposes only so that stowage device support 430 may be shown. Stowage device support 430 is substantially rigid and may be composed of metal, plastic, ceramic, and the like. In an embodiment, stowage device support 430 is metal. In embodiments as shown, stowage device support 430 has a substantially partially rounded configuration, which, without limitation, facilitates stowage of the weapon. Stowage device support 430 is not limited to such configuration but in alternative embodiments may have any other suitable configuration. Stowage device covering 425 may be composed of cloth, canvass, and the like and may provide a covering to a portion of stowage device support 430. In some embodiments, stowage device covering 425 has padding. Weapons stowage device 410 also includes strap securing means 435 with a portion of strap securing means 435 secured to stowage device base 420 and the other portion secured to weapons stowage strap 415. Strap securing means 435 may include a releasable securing means suitable for securing weapons stowage strap 415. In embodiments, strap securing means 435 is a quick release buckle. The length of weapons stowage strap 415 may be adjustable with strap adjustment means 440, which may be any means suitable for adjusting the length of weapons stowage strap 415.

In an embodiment of operation of weapons stowage system 400 as shown in FIGS. 8 and 9, an end of a weapon (i.e., rifle) is placed in weapons stowage device 410 with the end disposed upon stowage device base 420. Weapons stowage strap 415 is secured with strap securing means 435, which secures the weapon. The length of weapons stowage strap 415 may be adjusted to facilitate different weapons. The other end of the weapon may be secured in another weapons stowage device 410 of weapons stowage system 400.

Figure 10:
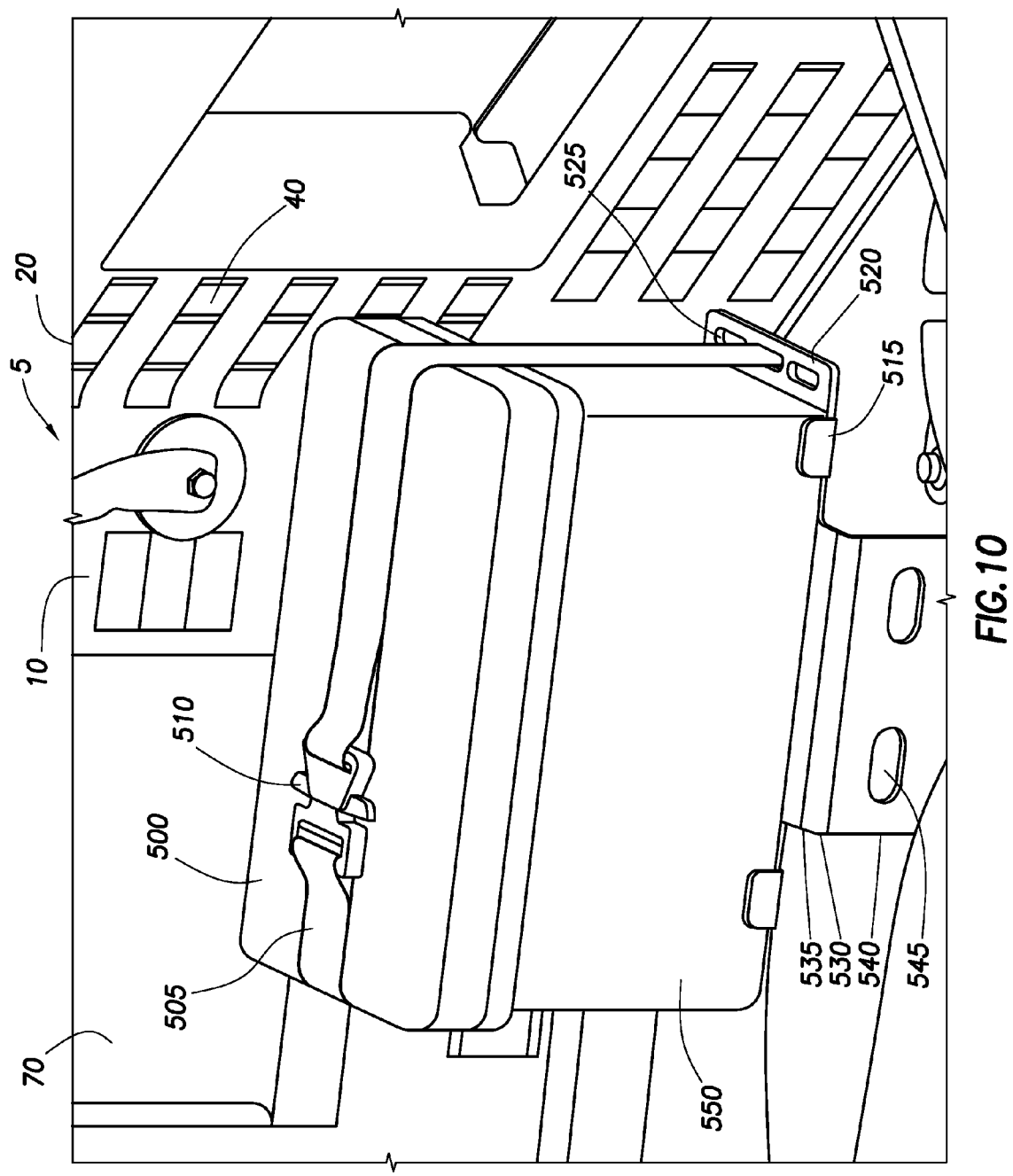
FIG. 10 illustrates an embodiment of a personnel protection system having a receptacle covering system.

FIG. 10 illustrates an embodiment of personnel protection system 5 having receptacle covering system 500. Without limitation, receptacle covering system 500 secures a receptacle 550 disposed in protected firing platform 20 and also provides contact force (i.e., blunt trauma) protection to receptacle 550, which protects personnel in protected firing platform 20 for such blunt force trauma. For instance, the contact force protection protects the personnel against blunt force trauma from contact with receptacle 550 (i.e., in case of a vehicle rollover, etc.) and also provides protection by preventing receptacle 550 from undesired movement within protected firing platform 20. Receptacle 550 may be an ammo can, water vessel, or the like.

As shown in FIG. 10, receptacle covering system 500 has removable receptacle cover 555, which covers the top and a portion of the sides of receptacle 550. In some embodiments (not illustrated), receptacle cover 555 covers substantially all of the sides of receptacle 550. In some embodiments, receptacle cover 555 includes protective padding 75. Receptacle covering system 500 also has receptacle base 530 upon which receptacle 550 is disposed. Receptacle base 530 is composed of any substantially rigid material such as metal, plastic, ceramic, and the like. In an embodiment, receptacle base 530 is composed of metal. Receptacle base 530 includes base body 535 and base support 540. Receptacle 550 is disposed upon base body 535, which in some embodiments is substantially horizontal. Base support 540 is secured to protected firing platform 20 and in some embodiments is substantially vertical. In an embodiment, base support 540 has base perforations 545, which, without limitation, reduce the weight of receptacle covering system 500. In embodiments, base body 535 has lateral stops 515, end portion 520, and end portion openings 525. Lateral stops 515 are raised portions of base body 535 and, without limitation, may prevent lateral movement of receptacle 550. In embodiments, base body 535 has end portion 520 on opposing ends of base body 535 (only one end portion 520 is shown in FIG. 10 for illustrative purposes only). End portion 520 has one or more end portion openings 525 through which one end of a receptacle strap 505 passes therethrough. End portion openings 525 also reduce the weight of base body 535. In an embodiment, each end of receptacle strap 505 is secured to an opposing end portion 520 from the other end of receptacle strap 505. In embodiments, receptacle strap 505 extends from each end portion 520 and extends along opposing sides of receptacle 550 and along the top portion of receptacle 550. Receptacle strap 505 also has receptacle strap securing means 510 that attaches the portions of receptacle strap 505 to each other. Receptacle strap securing means 510 may be any suitable securing means such as a quick release buckle. In some embodiments, the length of receptacle strap 505 is adjustable.

Figure 11:
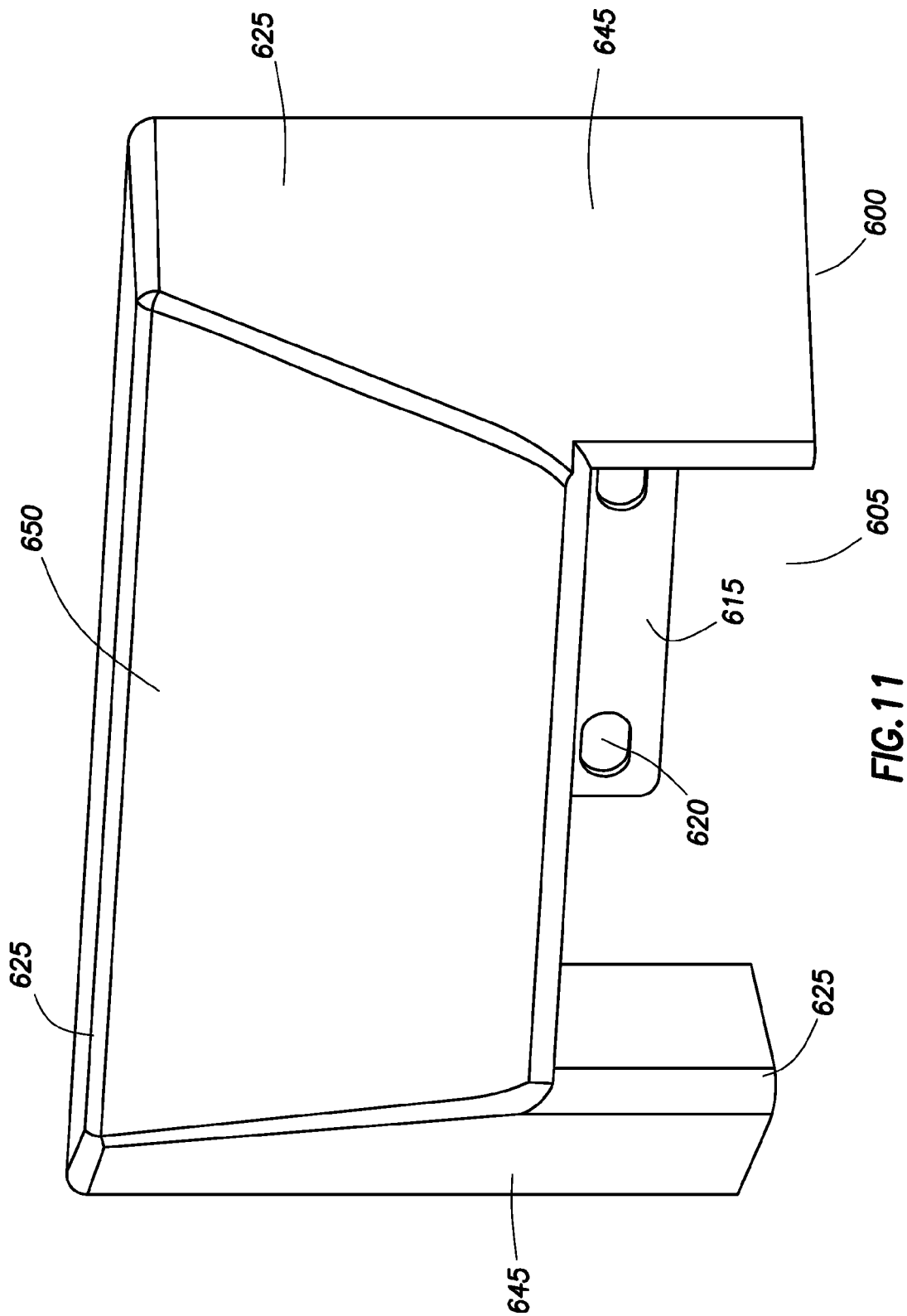
FIG. 11 illustrates an embodiment of a bracket cover.
Figure 12:
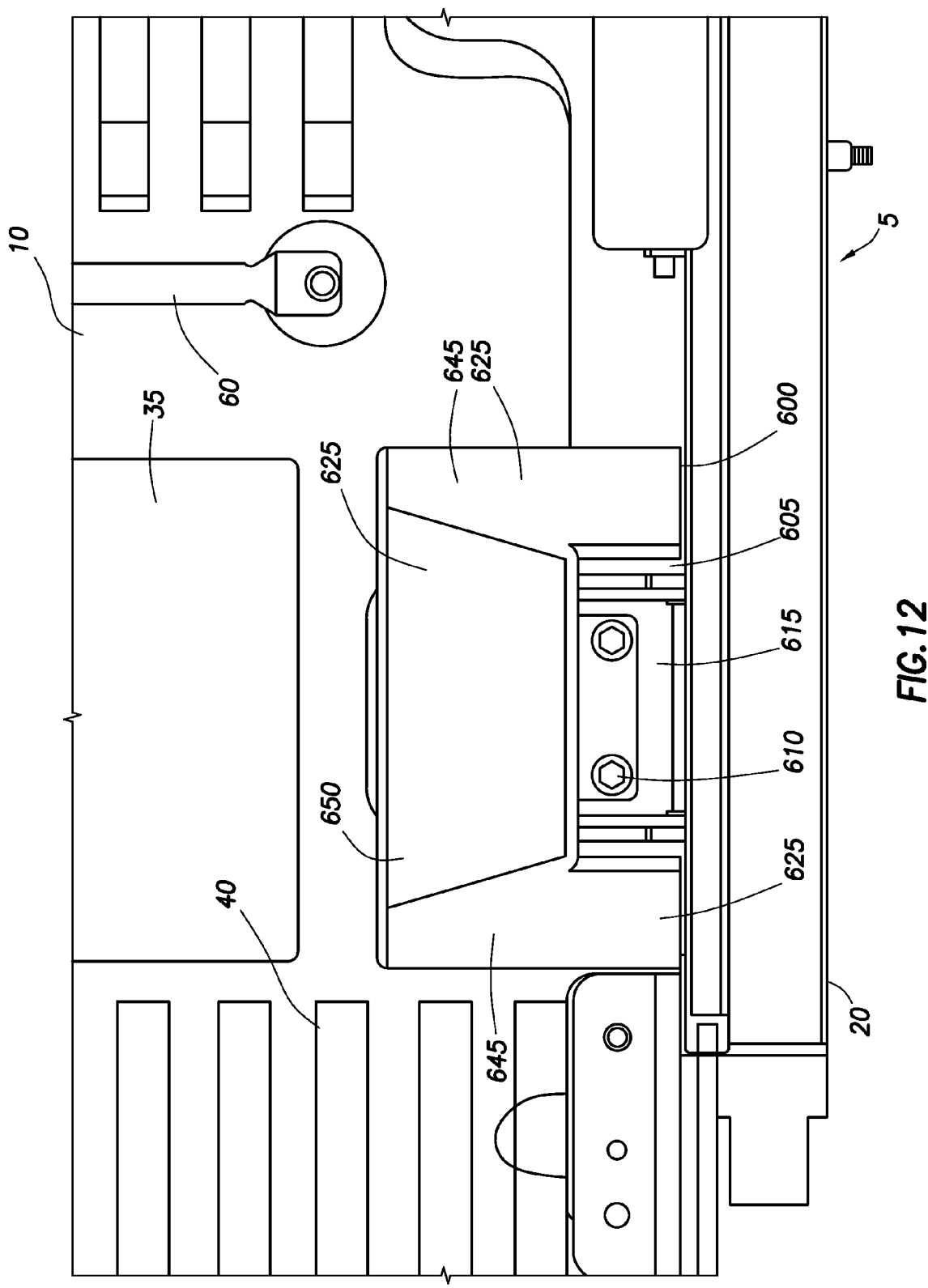
FIG. 12 illustrates an embodiment of a personnel protection system having a bracket cover.

In an embodiment as shown in FIGS. 11 and 12, personnel protection system 5 includes bracket cover 600. Bracket cover 600 includes bracket cover opening 605, bracket cover securing plate 615, and protective padding 625. In embodiments, bracket cover 600 has a configuration designed to sufficiently cover a bracket in protected firing platform 20 to prevent injury to personnel in protected firing platform 20 from blunt force trauma from contact with the bracket.

As shown in FIGS. 11 and 12, bracket cover securing plate 615 has bracket cover securing means openings 620 through which bracket cover securing means 610 secure bracket cover 600 to protected firing platform 20. Bracket securing means 610 may include any means suitable for securing bracket cover 600 to protected firing platform 20. In an embodiment, bracket securing means 610 includes screws, bolts, nails, and the like. In an embodiment, bracket securing means 610 include screws. In some embodiments, bracket securing means 610 use existing positions in protected firing platform 20, which, without limitation, allow the securing of bracket cover 600 without changing the structural integrity of protected firing platform 20. Bracket cover opening 605 provides access to bracket cover securing plate 615 to allow the securing of bracket cover 600 to protected firing platform 20.

As further shown in FIGS. 11 and 12, bracket cover 600 has bracket cover sides 645 and bracket cover top sloped side 650. In embodiments, bracket cover sides 645 are angled inward at an angle less than 90 degrees. In some embodiments, bracket cover top sloped side 650 is angled downward at an angle less than 90 degrees. In embodiments, bracket cover 600 (and therefore bracket cover sides 645 and bracket cover top sloped side 650) comprise protective padding 625. Protective padding 625 comprises energy mitigation padding. In some embodiments, protective padding 625 comprises protective padding 75.

Figure 13:
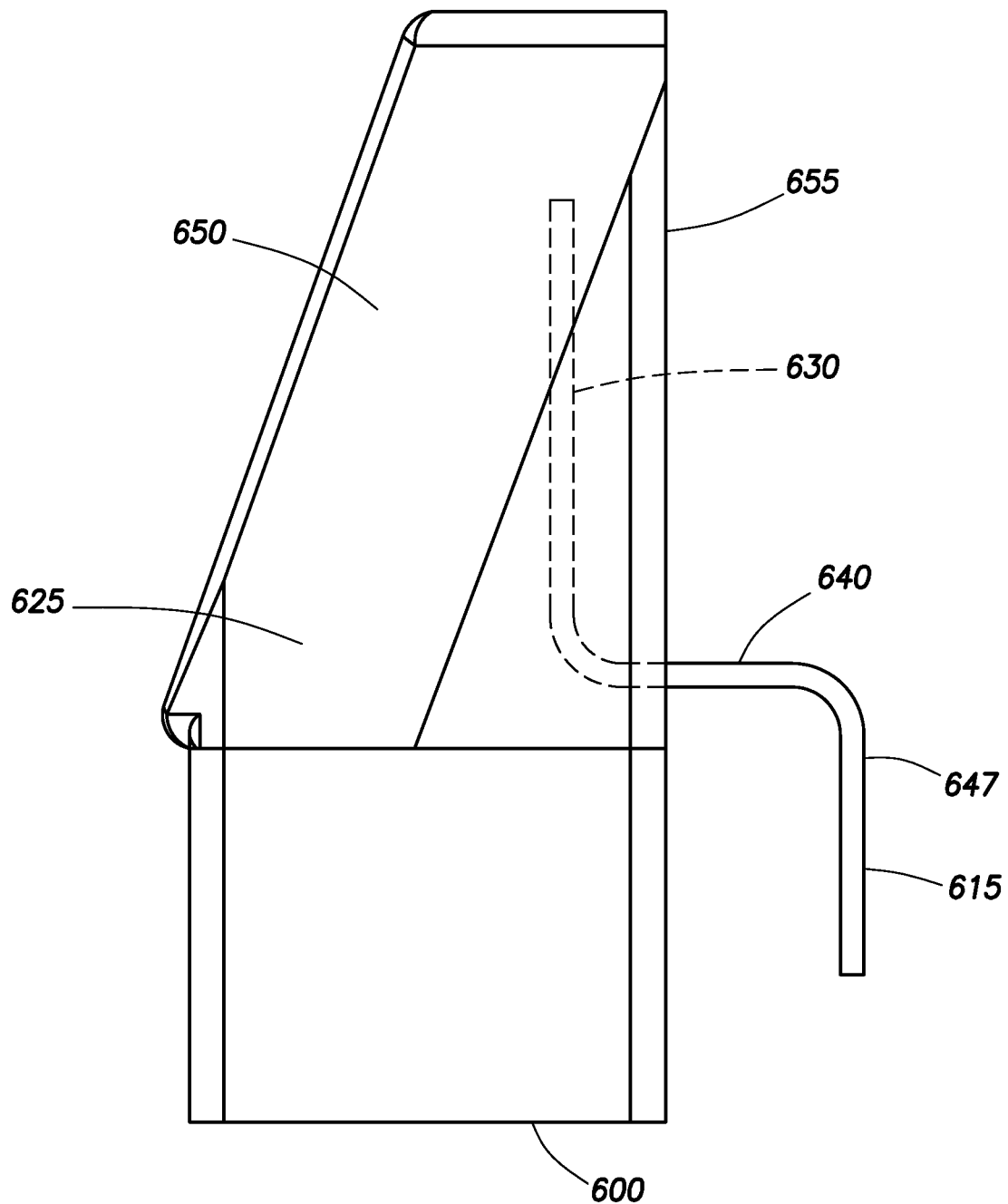
FIG. 13 illustrates a side view of an embodiment of a bracket cover.

FIG. 13 illustrates a side view of an embodiment of bracket cover 600. Protective padding 625 is shown in a see-through view for illustrative purposes only to allow bracket cover plate upper portion 630 to be shown. In the embodiment as shown, bracket cover securing plate 615 includes bracket cover plate upper portion 630, bracket cover plate middle portion 640 and bracket cover plate lower portion 647. Bracket cover plate lower portion 647 includes bracket cover securing means openings 620. Bracket cover plate middle portion 640 is the portion of bracket cover securing plate 615 between bracket cover plate upper portion 630 and bracket cover plate lower portion 647. In embodiments, bracket cover plate upper portion 630 is disposed within protective padding 625. Without limitation, disposing bracket cover plate upper portion 630 within protective padding 625 provides physical support to protective padding 625. In embodiments as shown, bracket cover plate upper portion 630 and bracket cover plate lower portion 647 are lengthwise in substantially parallel planes. In some embodiments, bracket cover plate middle portion 640 is substantially perpendicular to bracket cover plate upper portion 630 and bracket cover plate lower portion 647. In an embodiment, bracket cover plate upper portion 630 is lengthwise substantially parallel to back side 655.

Figure 14:
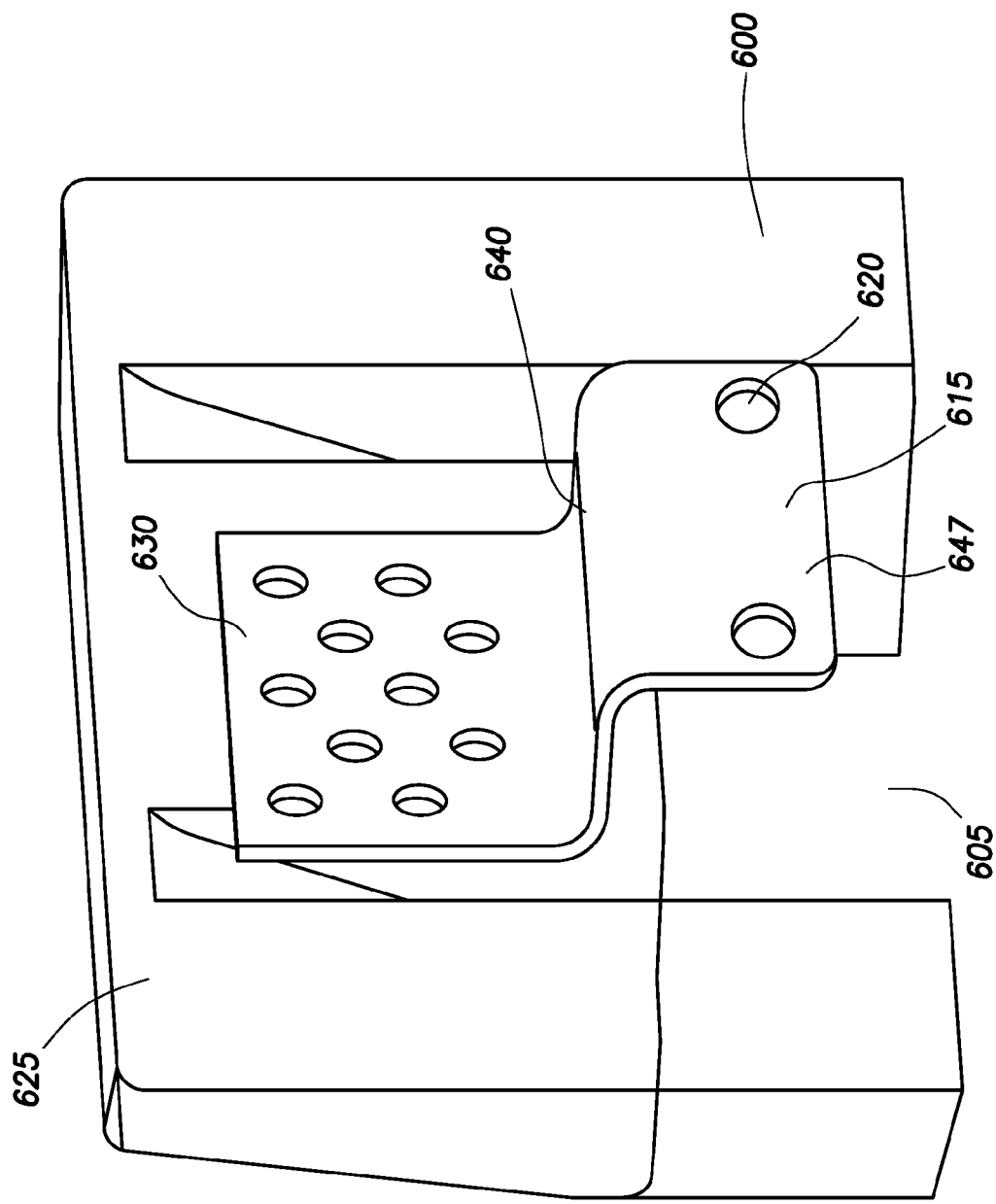
FIG. 14 illustrates a back view of an embodiment of a bracket cover.

In an embodiment as shown in FIG. 14, bracket cover plate upper portion 630 has bracket cover plate perforations 635. Without limitation, bracket cover plate perforations 635 reduce the weight of bracket cover 600. Further, without limitation, bracket cover plate perforations 635 improve adhesion of protective padding 625 to bracket cover plate upper portion 630. For instance, in some embodiments of manufacturing of bracket cover 600, the liquid that is to become protective padding 625 after it is set is added to a mold having bracket cover plate upper portion 630 disposed therein, and the liquid thereby flows through bracket cover plate perforations 635 and around bracket cover plate upper portion 630. It is to be understood that protective padding 625 is shown in see-through view for illustrative purposes only to show bracket cover plate upper portion 630.

Although the present invention and its advantages have been described in detail, it should be understood that various changes, substitutions and alterations may be made herein without departing from the spirit and scope of the invention as defined by the appended claims.

What is claimed is:

1. A protected firing platform protection system, wherein the protected firing platform protection system is adapted for use with a protected firing platform of a military vehicle, comprising:
   a protective padding capable of attachment to the protected firing platform, wherein the protective padding comprises a multilayer energy mitigation padding, wherein the multilayer energy mitigation padding comprises a low velocity impact protection layer, a high velocity impact protection layer, and a ballistic layer, wherein the protective padding is disposable within an interior of the protected firing platform when attached to the protected firing platform, and further wherein the protective padding further comprises a visual opening; and
   a carrier, wherein the protective padding is disposed within the carrier, wherein a plurality of stitching secures the protective padding to at least one edge of the protected firing platform protection system, wherein the stitching traverses the entire perimeter of the protected firing platform protection system and enclosing protective padding within the carrier, and wherein a protective coating is disposed on the exterior of the carrier;
   wherein the protective padding comprises an inflator, wherein the inflator comprises a nozzle disposed outside of a hatch pad.

2. The protected firing platform protection system of claim 1, wherein the energy mitigation padding is selected from at least one member of the group consisting of energy attenuation foam, honeycomb structures, and visco-elastic material.

3. The protected firing platform protection system of claim 1, further comprising a blanket, wherein an interior of the blanket is disposed within the carrier.

4. The protected firing platform protection system of claim 3, wherein the blanket comprises a flame retardant material.

5. The protected firing platform protection system of claim 3, wherein the blanket comprises a fluid resistant material.

6. The protected firing platform protection system of claim 3, further comprising stitching, wherein the stitching secures an outer edge portion of the protective padding to an outer edge portion of the blanket.

7. The protected firing platform protection system of claim 1, wherein the high velocity impact protection layer includes contact of personnel against the protected firing platform between about 50 ft/s and about 6,000 ft/s, and wherein the low velocity impact protection layer includes contact of personnel against the protected firing platform between about 1 ft/s and about 50 ft/s.

8. The protected firing platform protection system of claim 1, further comprising a molle strip and a locking molle carbiner, wherein the locking molle carbiner is attached to the molle strip.

9. The protected firing platform protection system of claim 1, further comprising a weapons stowage system comprising more than one weapons stowage device.

10. The protected firing platform protection system of claim 9, wherein each weapons stowage device comprises a stowage device base and a weapons stowage strap, wherein the stowage device base is secured to the protected firing platform.

11. The protected firing platform protection system of claim 10, wherein the stowage device base comprises a stowage device covering and a stowage device support.

12. The protected firing platform protection system of claim 11, wherein a portion of the stowage device support is disposed within the stowage device covering.

13. The protected firing platform protection system of claim 10, further comprising a weapons stowage base.

14. The protected firing platform protection system of claim 10, wherein the weapons stowage strap comprises an adjustable length.

15. The protected firing platform protection system of claim 10, wherein the weapons stowage strap comprises a quick release buckle.

16. The protected firing platform protection system of claim 1, further comprising a receptacle covering system.

17. The protected firing platform of claim 16, wherein the receptacle covering system comprises a receptacle cover and a receptacle strap, wherein the receptacle cover comprises protective padding.

18. The protected firing platform protection system of claim 1, further comprising a bracket cover, wherein the bracket cover comprises a protective padding.

19. The protected firing platform protection system of claim 18, wherein the bracket cover further comprises a bracket cover securing plate, wherein a portion of the bracket cover securing plate is disposed within the protective padding.

20. The protected firing platform protection system of claim 1, wherein the energy mitigation padding further comprises a plurality of high velocity impact protection layers and a plurality of low velocity impact protection layers.

* * * * *